United States Patent [19]
Larson

[11] 3,900,134
[45] Aug. 19, 1975

[54] AUTOMATIC PLANT WATERING APPARATUS

[76] Inventor: Harold B. Larson, 260 Bay St., San Francisco, Calif. 94133

[22] Filed: Nov. 26, 1973

[21] Appl. No.: 418,885

[52] U.S. Cl. .................... 222/52; 47/38; 137/78; 214/318; 222/166; 222/463; 239/65
[51] Int. Cl.² .............. B67D 5/08; A01G 27/00; F16K 17/36
[58] Field of Search ............ 47/38, 38.1, 1; 137/78; 214/300, 318; 239/63, 65; 222/52, 166, 463

[56] References Cited
UNITED STATES PATENTS

| | | | |
|---|---|---|---|
| 2,818,877 | 1/1958 | Swanson | 47/38.1 X |
| 2,843,693 | 7/1958 | Scriver | 200/85 R |
| 3,085,364 | 4/1963 | Chapin | 47/38.1 X |
| 3,168,224 | 2/1965 | Rios | 47/38.1 X |
| 3,448,689 | 6/1969 | Caldwell | 137/78 X |
| 3,696,827 | 10/1972 | Sterlich | 137/78 X |

FOREIGN PATENTS OR APPLICATIONS

| | | | |
|---|---|---|---|
| 116,795 | 7/1946 | Sweden | 47/38.1 |
| 86,675 | 10/1955 | Norway | 47/38 |

*Primary Examiner*—Clifford D. Crowder
*Assistant Examiner*—Steven A. Bratlie
*Attorney, Agent, or Firm*—Robert Charles Hill

[57] ABSTRACT

An impervious container having a relatively small discharge opening in the top thereof is supported for pivotal movement about an axis spaced from the center of gravity or balance point of the container so that a tipping moment about such axis is established. A rigid lever arm extends from the container and carries a relatively smaller container having a relatively larger open top. The level arm is of sufficient length that a small quantity of water in the relatively small container will retain the large container in an upright position against the tipping moment. The smaller container has a relatively larger surface area exposed to the atmosphere so that the water therein evaporates at a rate much greater than the water in the large container. When the water in the small container evaporates the weight thereof decreases so that the tipping moment causes the entire structure including the large container to tip and discharge water through opening therein. The water is conveyed to one or more plant containers. The time required for the water to discharge can be adjusted by adjusting the quantity of the water in the relatively smaller container or by adjusting the position of the smaller container along the lever arm.

4 Claims, 3 Drawing Figures

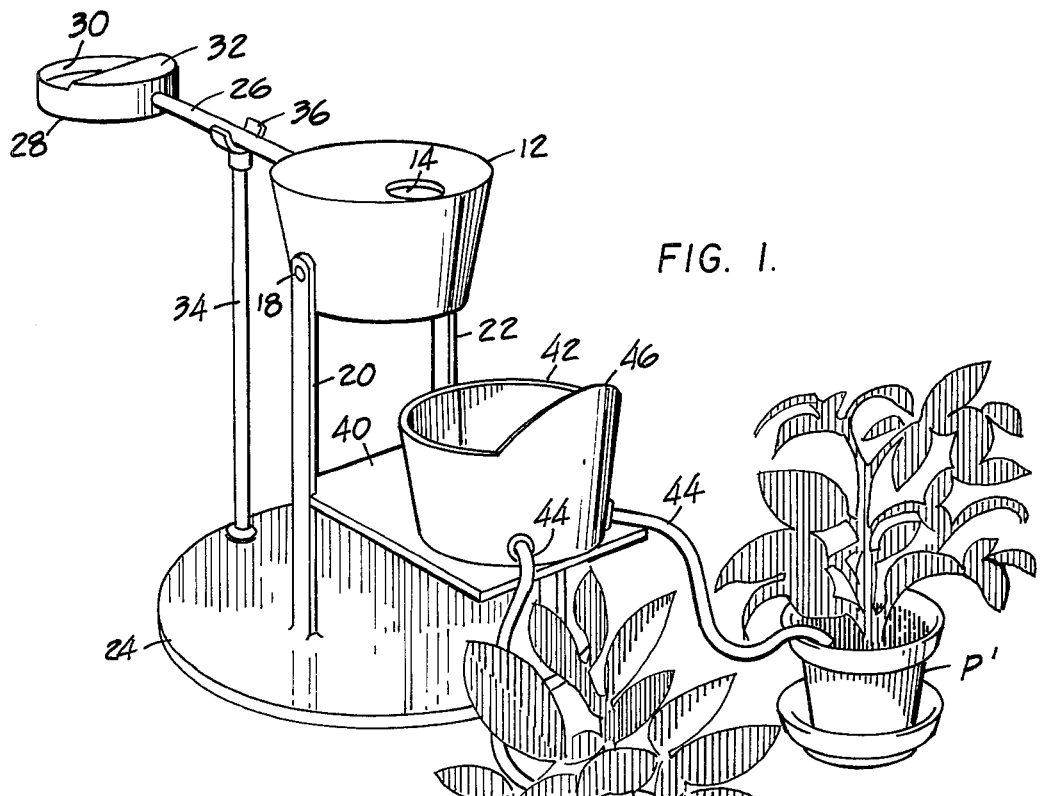
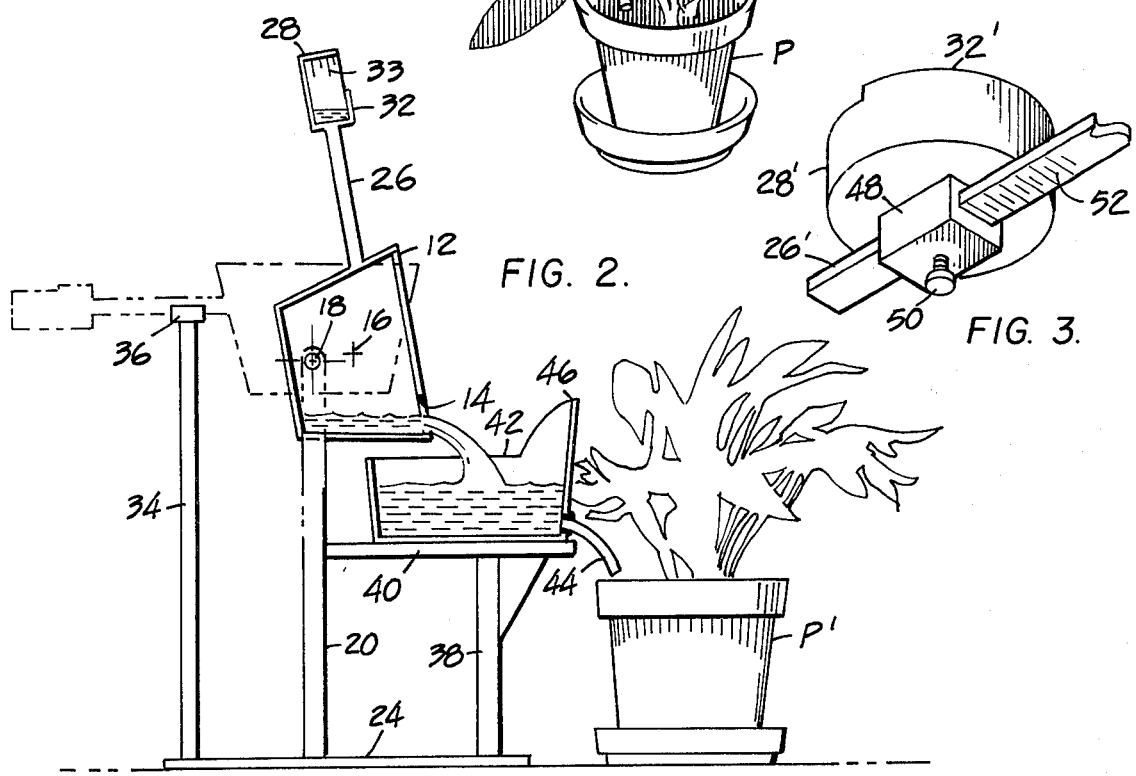
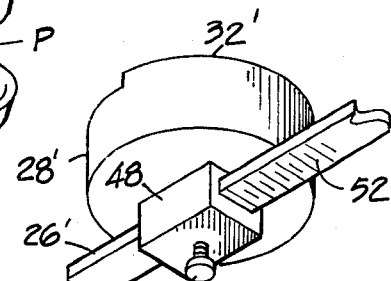
FIG. 1.
FIG. 2.
FIG. 3.

AUTOMATIC PLANT WATERING APPARATUS

FIELD OF THE INVENTION

This invention relates to automatic plant watering devices and more particularly to devices for automatically watering house plants during the occupant's absence from the premises.

Vigorous and healthy indoor plants require periodic watering. Owners of such plants experience inconvenience during long absences from the premises in that failure to water house plants at proper intervals is detrimental to the health of such plants. In order to eliminate the necessity to arrange for a third party to water the plants periodically or the necessity to transport the plants to a location where they can be cared for, the present invention provides an automatic watering device.

SUMMARY OF THE INVENTION

The present invention provides an automatic watering device which will apply water to potted plants after a predetermined and adjustable interval of time. The invention includes a relatively large container that is filled with a quantity of water sufficient to irrigate the plants. The container has a relatively small discharge opening to avoid substantial evaporation therefrom and is supported for pivotal movement about an axis that is displaced from the center of gravity or balance point of the container. There is thus a tipping moment on the container which tends the container to tip to a water discharging position. For counter balancing such tipping moment a lever arm extends from the container. Secured to the lever arm remote from the container is a relatively small container or dish. The volume of the small container and the distance from the pivot axis are such that when the small container is filled with a predetermined amount of water it will counteract the tipping moment and retain the large container in an upright position. The small container or dish has a large opening so that the water therein is subject to evaporation. When the water evaporates to an extent that the weight thereof is insufficient to maintain the large container in an upright position, the main container tips and discharges water into a potted plant disposed therebelow. The interval between the time the apparatus is set up and the time it discharges the water is adjustable. Such adjustability can be achieved by regulating the amount of water introduced into the small container or dish or by adjusting the position of such dish along the lever arm. Devices designed in accordance with the present invention have achieved water discharge after periods in the range of two days to eight days after the apparatus is initially set up.

An object of the present invention is to provide a device which automatically supplies water to plants after a predetermined interval in order to relieve the owner of the plants from the inconvenience while absent from the premises for an extended period. This object is achieved because the water in the small container which provides a counter balancing force evaporates slowly over a time period until the tipping moment of the large container exceeds the counter balancing force due to the weight of the water in the small container or dish.

Another object is to provide a device of the character referred to that has facilities for adjusting the time period for discharging water. The force that counter balances the tipping moment is the product of the mass of the water in the small container and the length between that mass and the pivot axis. The force can be adjusted by either regulating the amount of water placed in the small container or the distance from the weight of the small container to the pivot axis or both. Consequently, depending on the type of plant involved, the weather conditions, and the time of expected absence from the premises, the owner of the plants can achieve virtually any time interval between his departure and the time that the water is supplied to the plants.

Still another object is to provide an automatic plant watering device that compensates for weather changes. If after the owner's departure the humidity experiences an unexpected decrease the time that the plant can do without additional water is short. If the humidity decreases the water in the relatively small container or dish evaporates faster and therefore the time interval before water discharge is short. Contrarywise if the humidity rises substantially the water in the small container or dish will evaporate slower and thereby extend the duration before water is supplied to the plants.

Still another object of the present invention is to provide a device of the character referred to above that requires no power. Accordingly, if there is a power failure during the owner's absence the operation of the device of the invention is not affected. This object is achieved because the main container is mounted so that there is a tipping moment thereon which is resisted by water in a dish having a large surface area exposed to the atmosphere. Consequently the water in the dish evaporates until the weight of such water is insufficient to resist the tipping moment of the large container whereupon the large container discharges its water.

The foregoing together with other objects, features and advantages will be more apparent after referring to the following specification and the accompanying drawings.

BRIEF DESCRIPTION OF THE DRAWING

FIG. 1 is a perspective view of the automatic watering apparatus of this invention in an upright position.

FIG. 2 is a side elevation view of the device of FIG. 1 shown in a water discharging position.

FIG. 3 is a fragmentary detailed view of a modification of the device.

Referring more particularly to the drawing reference numeral 12 indicates a relatively large container. Container 12 is totally closed with the exception of a relatively small discharge opening 14 which is formed in the top wall thereof adjacent the rim. Container 12 has a balance point or a center of gravity indicated at 16 in FIG. 2. Container 12 is supported for pivotal movement on a pair of pivot pins one of which is indicated at 18. The pivot pins are in turn supported by uprights 20 and 22, the lower ends of which are rigid with a base plate 24. As seen most clearly in FIG. 2 the axis of pivot pin 18 is spaced vertically and laterally from balance point 16 so that when the container 12 is in the position shown in FIG. 1 (and in the broken line position of FIG. 2) there is a tipping moment about the axis of pin 18 which tends to move the container to the water discharge position shown in solid lines in FIG. 2.

Mounted rigid with container 12 and extending therefrom and from the axis of pin 18 in the direction opposite from the location of balance point 16 is a rigid lever arm 26. At the distal end of lever arm 26 is a relatively small container or dish 28. Dish 28 has a relatively large opening 30, the only obstruction of opening 30 being a baffle plate 32 that extends over approximately one-third of the top of the dish adjacent rod 26. The purpose of the lip, as seen in FIG. 2, is to avoid spillage of the water remaining in dish 28 when the device moves to the water discharge position. On the inner surface of the horizontal walls that form dish 28 are a series of graduations 33. As will appear hereinafter the graduations enable dish 12 to be filled to any one of a number of levels.

Extending upward from base 24 is a yoke 34 on the top extremity of which is a cradle 36 positioned to support lever arm 26. As seen in FIG. 2 the height of cradle 34 is such as to retain lever arm in a generally horizontal position when the apparatus is in the upright position.

Also extending upward from base 24 is an auxiliary leg 38 which in conjunction with legs 20 and 22 supports a platform 40 at a level below discharge opening 14 when the apparatus is in the discharge position. Disposed on platform 40 is an open top container 42 having at the lower extremity thereof one or more conduits 44. The conduits 44 are typically rubber or plastic hoses which can be placed as shown in FIG. 1 in communication with flower pots P and P'. Container 42 preferably has an upstanding wall extension 46 opposite the position of discharge opening 14 so as to avoid water spillage as the container 12 pivots about pin 18 to the discharge position.

The operation of the invention is as follows:

Pots P and P' are set up adjacent the apparatus and conduits 44 are arranged so that their outlet ends are interior of the pots. Container 12 is filled through opening 14 while lever arm 26 is manually retained in cradle 36. Water is then placed into dish 28, graduations 33 indicating various levels for various durations of discharge. When container 28 is filled to an appropriate level the apparatus will reside in the position shown in FIG. 1, the mass of the water in dish 28 retaining lever arm 26 in cradle 36 and also retaining container 12 in an upright position. As time passes the water slowly evaporates from container 28. Such evaporation can proceed because opening in the dish is substantially coextensive with the horizontal cross-sectional shape of the dish. After a duration determined by the quantity of water originally placed in dish 28 and by the temperature and humidity conditions in the room in which the apparatus is placed the weight of the water becomes insufficient to retain the apparatus in an upright position. Thereupon the tipping moment exceeds the counter balancing force and container 12 moves to the discharge position shown in FIG. 2. The water is discharged from container 14 into container 42 and thence through conduits 44 to pots P and P'. Baffle plate 32 prevents the remaining water in dish 28 from spilling when the apparatus moves to the discharge position of FIG. 2.

A modification of the invention is shown in FIG. 3. The modification affords an additional means for adjusting the time interval between setting the apparatus and discharging water therefrom. Rod 26' is substantially identical to rod 26 in FIG. 1. A dish 28' having a lip 32' is substantially identical to parts bearing corresponding reference numerals in FIG. 1. Depending from the lower surface of dish 28 and secured rigidly therewith is a block 48 which is bored to slidably receive lever arm 26'. A thumb screw 50 is threaded in block 48 and communicates with the bore so that on tightening the screw 50, the position of dish 28' is fixed on lever arm 26'. The screw 50 can be loosened to establish such position at virtually any position along lever arm 26'. Lever arm 26' can be graduated as at 52 to assist the user in properly positioning the dish along the lever arm.

The operation of the modification of FIG. 3 affords an additional means for adjusting the time interval after which the apparatus moves to the discharge position. That is to say the user loosens screw 50 and positions dish 28' at the appropriate position on lever arm 26' by reference to graduations 52. Container 12 and dish 28' are then filled and operation proceeds as described above in connection with FIG. 2.

Because the force counter balancing the tipping moment on container 12 is proportional to the product of the quantity of water in dish 28 and the distance of dish 28 from the axis of pin 18, such force can be adjusted by adjusting either the quantity of water in the dish or the position of the dish along lever arm 26. Accordingly, either graduations 33 or the position of dish 28' on lever arm 26' or both can be employed to establish a desired time interval for discharge of water.

The apparatus is relatively compact so that the temperature and humidity at the plants in P and P' is substantially identical to that surrounding dish 28. Accordingly, if unexpectedly dry conditions arise, which might adversely affect the plants in pots P and P', the water in dish 28 (or 28') evaporates more quickly and therefore the discharge of water is achieved earlier, a desirable condition. Although the time interval between setting up the apparatus and the discharge of water therefrom varies with the particular climatic conditions, it has been found that the accuracy achieved is adequate for this purpose. For example, in one design and setting according to the present invention the discharge times varied from 6 days and 2 hours to 6 days and 5 hours. Another example of another setting produced results ranging from three days to three days and eight hours. Still another example gave discharge times in the range of two days to two days two hours. Virtually any time duration can be achieved with sufficient accuracy to avoid adversely affecting the plants by altering the dimensions and/or volumes of the containers in the apparatus. Since such variations are thought apparent to the skilled artisan after reading the foregoing description they will not be further alluded to herein.

Although it is preferred to construct the apparatus out of plastic materials it should be apparent that other materials such as galvanized steel, copper, and the like can be employed. Moreover conduits 44 can be formed of relatively flexible plastic or rubber hose or of relatively rigid copper tubing or the like.

Although container 42 is useful when two or more plants are to be watered it should be obvious that when the apparatus is used to water only one pot container 42 as well as platform 40 can be dispensed with.

Thus it will be seen that the present invention provides an automatic watering apparatus which requires no external power which is simple of construction, and which can be adjusted to discharge water to plants after virtually any reasonable time interval.

Although one embodiment has been shown and described it will be obvious that other adaptations and modifications can be made without departing from the true spirit and scope of the invention.

What is claimed is:

1. Automatic plant watering apparatus comprising a first relatively large impervious substantially covered container having a center of gravity and pivotally supported by upright members extending from a base member for pivotal movement about an axis spaced in a first direction from said center of gravity so as to create a tipping moment about said axis, a lever arm attached to said first container and extending therefrom, a second substantially open container mounted on said arm in counterbalanced relationship to said first container and spaced from said axis, means for adjusting and slidably mounting said second container on said arm a vertical member extending from said base member limiting the movement of said lever arm to a horizontal position, and quantities of liquids within said first and second containers, whereby at a predetermined time the evaporation of liquid from the second container eliminates the counterbalanced relationship of said containers causing said containers to move from a horizontal position to a vertical position thereby discharging liquid from said first container to an auxiliary container, means extending from said base member for supporting said auxiliary container subjacent thereto and in liquid receiving relation to said first container in the discharge position, and at least one conduit secured to said auxiliary container for conveying liquid therein to a remote site containing at least one plant.

2. Apparatus according to claim 1 including a baffle plate spanning a minority of the opening of said second container so as to avoid liquid spillage from said container in the vertical position.

3. The automatic plant watering apparatus of claim 1 wherein the vertical member has a U-shaped cradle on the top extremity thereof for supporting the lever arm.

4. The automatic plant watering apparatus of claim 1 wherein the second container has gradations therein to enable the second container to be filled with liquid to a predetermined level.

* * * * *